United States Patent [19]
Garrett

[11] Patent Number: 6,007,603
[45] Date of Patent: Dec. 28, 1999

[54] CONTROLLING ATMOSPHERES IN CONTAINERS

[75] Inventor: Michael E. Garrett, Woking, United Kingdom

[73] Assignee: The BOC Group plc, Windlesham, United Kingdom

[21] Appl. No.: 09/105,578

[22] Filed: Jun. 26, 1998

[30] Foreign Application Priority Data

Jul. 2, 1997 [GB] United Kingdom .................. 9713989

[51] Int. Cl.$^6$ .......................... B01D 53/22; B01D 53/047
[52] U.S. Cl. .......................... 95/12; 95/51; 95/52; 95/54; 95/117; 95/139; 96/8; 96/9; 96/111; 426/419
[58] Field of Search .................. 95/8, 10, 12, 50–52, 95/54, 117–119, 139; 96/4, 8, 111, 130; 426/418, 419

[56] References Cited

U.S. PATENT DOCUMENTS

| | | | |
|---|---|---|---|
| 3,594,986 | 7/1971 | Schmid | 95/139 |
| 3,710,547 | 1/1973 | Nelson | 95/139 X |
| 4,566,282 | 1/1986 | Knoblauch et al. | 426/419 X |
| 4,711,645 | 12/1987 | Kumar | 95/139 X |
| 4,740,378 | 4/1988 | Jameson | 426/419 |
| 4,781,907 | 11/1988 | McNeill | 95/51 X |
| 4,817,391 | 4/1989 | Roe et al. | 426/419 X |
| 4,829,774 | 5/1989 | Wassibauer | 426/419 X |
| 4,961,322 | 10/1990 | Oguma et al. | 426/419 X |
| 5,053,058 | 10/1991 | Mitariten | 95/8 |
| 5,120,329 | 6/1992 | Sauer et al. | 95/8 |
| 5,156,009 | 10/1992 | Woodruff | 95/54 X |
| 5,169,412 | 12/1992 | Prasad et al. | 95/54 X |
| 5,308,382 | 5/1994 | Prasad | 95/12 |
| 5,332,547 | 7/1994 | Olson et al. | 426/419 X |
| 5,342,637 | 8/1994 | Kusters et al. | 426/419 X |
| 5,355,781 | 10/1994 | Liston | 426/419 X |
| 5,451,248 | 9/1995 | Sadkowski et al. | 426/419 X |
| 5,457,963 | 10/1995 | Cahill-O'Brien et al. | 426/419 X |
| 5,470,379 | 11/1995 | Garrett | 95/12 X |
| 5,507,855 | 4/1996 | Barry | 95/12 |
| 5,515,693 | 5/1996 | Cahill-O'Brien et al. | 426/419 X |
| 5,623,105 | 4/1997 | Liston et al. | 426/419 X |
| 5,649,995 | 7/1997 | Gast, Jr. | 96/8 X |
| 5,676,736 | 10/1997 | Crozel | 95/51 X |
| 5,803,950 | 9/1998 | Barnhard et al. | 95/10 X |
| 5,827,351 | 10/1998 | Prasad et al. | 95/54 X |
| 5,873,928 | 2/1999 | Callahan | 95/51 X |

FOREIGN PATENT DOCUMENTS

| | | | |
|---|---|---|---|
| 0294036 | 12/1988 | European Pat. Off. | 95/50 |
| 0430304 | 6/1991 | European Pat. Off. | 95/52 |
| 0 467 668 A1 | 1/1992 | European Pat. Off. | |
| WO91/11913 | 8/1991 | WIPO | 426/419 |

*Primary Examiner*—Robert Spitzer
*Attorney, Agent, or Firm*—David M. Rosenblum; Salvatore P. Pace

[57] ABSTRACT

A system for controlling the atmosphere in the container comprising a membrane separation apparatus to separate nitrogen and a second separation apparatus, adapted to separate carbon dioxide and water vapor from a gas mixture in the container. The separated nitrogen is returned to the container, as is at least a portion of the carbon dioxide and water vapor, so as to produce and/or maintain a predetermined atmosphere composition within the container thereby to prevent spoilage of perishable products within the container.

8 Claims, 1 Drawing Sheet

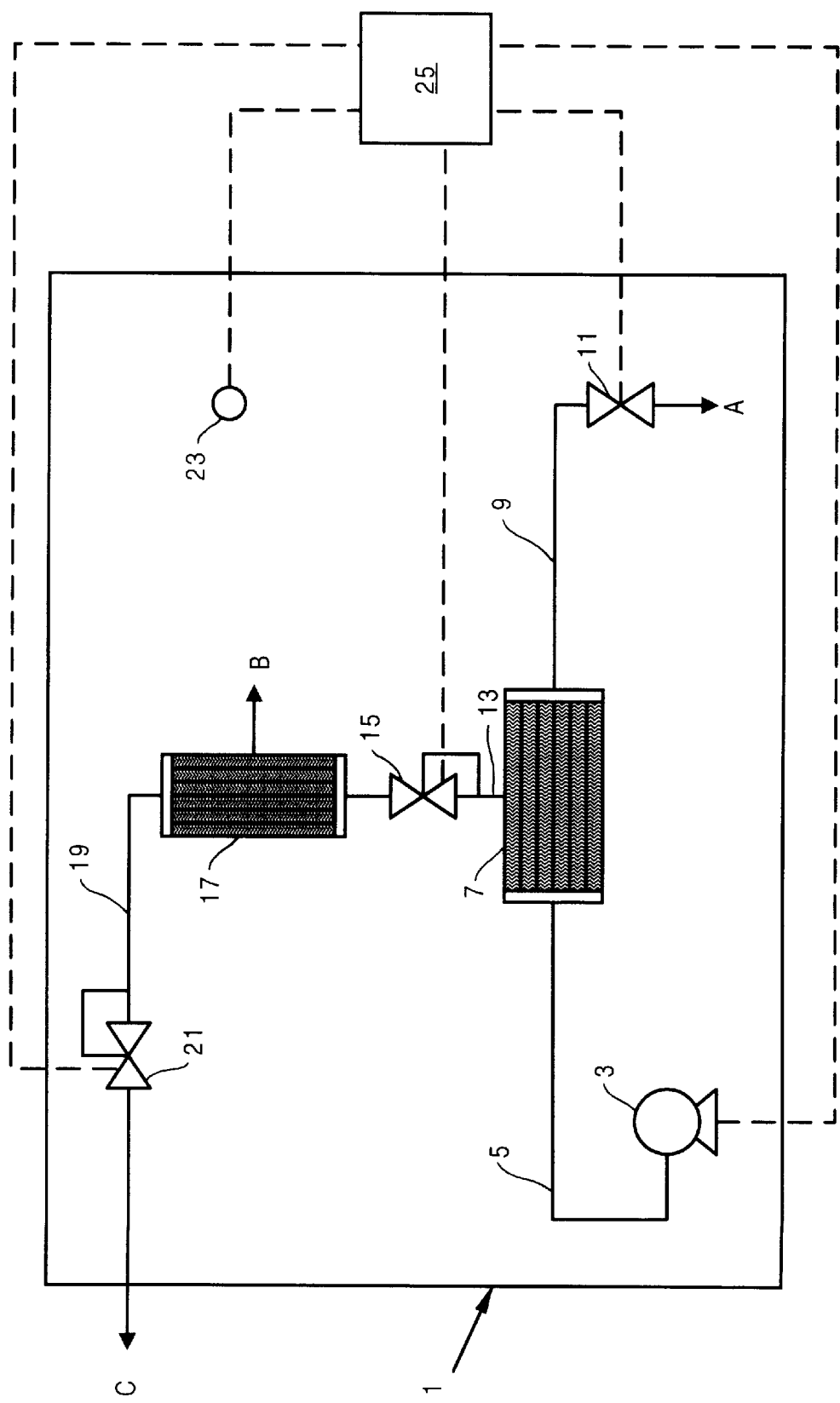

CONTROLLING ATMOSPHERES IN CONTAINERS

BACKGROUND OF THE INVENTION

The present invention relates to systems for controlling the atmosphere within containers and more particularly to systems for controlling the atmosphere in containers used for the storage and transportation of perishable produce such as fruit, vegetables and flowers.

It is known that during the storage and/or transportation of perishable produce its preservation can be enhanced by controlling the atmosphere surrounding the produce. For example, it has been found that an atmosphere in which nitrogen predominates is particularly useful for controlling the preservation of perishable products. Furthermore, in addition to controlling the amount of oxygen present in the atmosphere there has also been found a need to control the amount of other substances which may be present, for example, carbon dioxide and ethylene which might be formed by the produce whilst contained within the container.

In our European Patent Application EP-A-467668 there is described a system for controlling the atmosphere of a container for use in the storage and/or transportation of perishable goods. The system includes adsorption means in the form of a plurality of beds, each bed being designed preferentially to adsorb from the atmosphere one or more of water vapor, carbon dioxide, oxygen and ethylene. Some of the beds are designed to work on a temperature swing adsorption cycle and at least one bed is designed to operate on a pressure swing adsorption/desorption cycle. Although the system described in our earlier application achieves all of the requirements in terms of atmosphere control it remains complicated and somewhat bulky.

As a simpler alternative to such adsorption/desorption, systems incorporating semi-permeable membranes have been employed; known plants for the separation of gas mixtures, for example, air, by such membranes are constructed so as to present a large surface area of membrane to the air to be separated.

For example, such plants may employ a multitude of identical, elongate, hollow fibers which are formed from a suitable semi-permeable membrane and which extend in parallel to one another. The fibers are usually mounted in and typically extend from one end to the other of a pressure vessel. The air to be separated is fed under pressure into a header at or adjacent one end of the fibers so that it flows longitudinally through the fibers. The insides of the fibers are maintained at a higher pressure than that which obtains on the outside of the fibers. The components of the air diffuse through the membranes at different speeds such that as the air passes along the inside of a membrane so a faster permeating component, for example, oxygen, passes more and more to the low pressure side. Accordingly, a nitrogen rich product gas in the order of 99.5% by volume nitrogen may be withdrawn under pressure from the end of the pressure vessel opposite that at which the feed gas is introduced.

Membrane systems are generally used in two configurations to control the amount of oxygen within food transport containers:

a) to separate nitrogen from the atmosphere surrounding the container and adding it to the container to displace oxygen, or b) to separate nitrogen from the atmosphere within the container and recirculating the separated nitrogen back into the container to displace oxygen.

In both configurations, the remaining, nitrogen-depleted atmosphere is usually vented to environment. Such systems suffer from the fact that the membranes are highly permeable to carbon dioxide (and water vapor), which therefore tends to pass through the system with the non-nitrogenous part of the atmosphere and is then vented; this leads to carbon dioxide- and water vapor-depletion of the atmosphere within the container, which is damaging to certain high quality perishable products. Accordingly, in practice system a) is usually employed on an intermittent basis so that too much carbon dioxide is not lost, but this is relatively crude, inefficient and unable to maintain the accurate control of atmosphere composition which is necessary for high quality food products. System b) is not often employed, because the loss of carbon dioxide and water vapor is much greater than with system a).

It is an aim of the present invention to address the above problems, and to provide a simple and effective system which will achieve independent control of the gases likely to be found in the atmosphere of a container for perishable goods.

SUMMARY OF THE INVENTION

The present invention provides a method for modifying the composition of a gas mixture comprising nitrogen, oxygen, carbon dioxide, water vapor and ethylene contained in a chamber, the method comprising: pressurizing a portion of said atmosphere; passing said pressurized atmosphere through an apparatus for separating air by means of semi-permeable membranes through which the components of the air diffuse at different speeds and adapted to separate nitrogen from the pressurized atmosphere; returning said separated nitrogen to the chamber; passing said nitrogen-depleted pressurized atmosphere to an apparatus adapted to separate the carbon dioxide and the water vapor from the oxygen and ethylene; returning at least a portion of said carbon dioxide and said water vapor to the chamber, and venting said oxygen and ethylene to environment.

The chamber may be a standard ISO transportation container, but for the avoidance of doubt, the word "container" used throughout this specification is intended to embrace not only individual containers but also enclosed parts of warehouses, ships holds and the like. Such an arrangement provides a way of recapturing the carbon dioxide from the stream of gas withdrawn from the container using a small and relatively simple membrane system, which system can produce and maintain any desired gas composition within the container.

Preferably the second apparatus, that for separating the carbon dioxide and the water vapor, also comprises a module containing semi-permeable membranes, although an alternative arrangement in which the second apparatus is a pressure swing adsorption (PSA) device may be more appropriate for some applications, or for producing particular gas compositions within the container.

The amount of carbon dioxide and water vapor returned to the container may be controlled by means adapted automatically to vary the amount of gas returned in response to signals indicative of the gas composition sensed within the container. For example, certain food products will continue to respire carbon dioxide accompanied by carbon dioxide in a nitrogen-rich atmosphere, and to prevent the carbon dioxide concentration within the container reaching a level at which damage might be caused to the product it would be necessary to reduce the amount of separated gas returned to the container. This can be achieved by a simple system comprising sensors for measuring the gas composition in the container and connected to a suitably-programmed microprocessor which actuates valves to vary the return of separated carbon dioxide and water vapor according to the (pre-programmed) requirements of a particular food product.

BRIEF DESCRIPTION OF THE DRAWINGS

An embodiment of the invention will now be described, by way of example, reference being made to the FIGURE of the accompanying diagrammatic drawing which is a schematic diagram of a system for controlling the atmosphere within a container.

DETAILED DESCRIPTION

As shown in the schematic FIGURE, a system for controlling the atmosphere in a container 1 for perishable goods such as fruit, vegetables and flowers comprises a compressor 3 for drawing in air from within the container 1 and feeding it under pressure along line 5 to a membrane separation module 7. The membrane separation module 7 is adapted so as to permit oxygen, carbon dioxide, ethylene and water vapor to permeate through the membranes to the low pressure side of the module and to produce a nitrogen-rich product gas at the high pressure side of the module, as is generally known in the art. The nitrogen-rich product gas exits module 7 along line 9 and is returned to the interior of the container, as shown by the Arrow A, under the control of valve 11.

The nitrogen-depleted product gas exits from the low pressure side of module 7 via line 13 and passes therealong, via valve 15 to a second separation membrane module, or cartridge, 17. Membrane module 17 is adapted to permit carbon dioxide and water vapor to permeate through to the low pressure side, these being returned to the interior of the container 1 as shown generally by Arrow B. The remainder of the gas fed to module 17, principally oxygen and ethylene, exits the high pressure side of module 17 via line 19, and under the control of valve 21, to vent to the environment outside the container 1 as shown generally by the Arrow C.

Those skilled in the art of membrane separation will be aware that the separation effected by membrane devices is susceptible to the pressure at which the feed gas is supplied thereto. The pressure at which the nitrogen-depleted gas is fed to module 17 will affect the amount of carbon dioxide which permeates through to the low side of module 17 to be returned to the container 1 (water vapor, having the higher permeability, will be returned, via the low pressure side of module 17, to the container 1). Thus valve 15 can be set so as to determine whether the carbon dioxide is returned to the container 1 or vented to the environment outside.

In operation the illustrated system provides the container 1 with a gaseous atmosphere having a predominant amount of relatively inert nitrogen, so as to prevent the tendency of perishable food stuffs such as fruits and vegetables contained within container 1 to consume oxygen and, over time, to spoil. By actuating valve 15 the proportion of carbon dioxide returned to the container can be controlled, depending upon the requirement of the perishable food stuffs within the container, and on the composition of the atmosphere within the container as sensed by sensor 23. Due to factors such as leakage through the walls of the container, the composition of the atmosphere within the container will vary with time. For example, an initially nitrogen-rich, oxygen depleted atmosphere will gradually revert to the nitrogen/oxygen concentration in ambient air. Suitably, a controller 25, such as an appropriately programmed microprocessor is operatively connected to compressor 3, valves 11, 15 and 21 and sensor(s) 23 so as automatically to control the amount of nitrogen and/or carbon dioxide and water vapor returned to the atmosphere within the container 1.

A regenerative desiccant (not shown) may be provided, upstream of compressor 3 or in line 5 so as to absorb any free water in the air drawn into the system on start up, which free water could block the pores in the membrane by capillary action. Once the system has reached a steady temperature the relative humidity of the feed air into compressor 3 would drop and thus desorb the moisture from the regenerative desiccant.

Having described one embodiment of the present invention, those skilled in the art will readily envisage a number of modifications. For example, the second membrane module 17 may readily be replaced with a pressure swing absorption device of the type known in the art for separating carbon dioxide and water vapor from a gas stream comprising those gases together with oxygen and ethylene. The PSA device may comprise two vessels, essentially in series, one acting as an absorber for water vapor and the second as an absorber for carbon dioxide (alternatively the first and second absorbers connect to absorb carbon dioxide and ethylene, respectively). Such a system would be less compact than systems comprising two membrane modules, but could provide a significantly increased throughput. The two membrane module system or the hybrid membrane module/PSA device system, can be arranged with the appropriate valves and compressors so as to operate in the recycle mode, giving a higher output than in conventional membrane separation systems using the simple gas supply mode.

I claim:

1. The method for modifying the composition of an atmosphere comprising nitrogen, oxygen, carbon dioxide, water vapor and ethylene contained in a chamber, the method comprising:

a) pressurizing a portion of said atmosphere to produce a pressurized atmosphere;

b) passing said pressurized atmosphere through an apparatus adapted to separate nitrogen from the pressurized atmosphere by means of semi-permeable membranes through which components of air diffuse at different speeds to produce separated nitrogen and a nitrogen-depleted pressurized atmosphere;

c) returning said separated nitrogen to the chamber;

d) passing said nitrogen-depleted pressurized atmosphere to an apparatus adapted to separate the carbon dioxide and the water vapor from the oxygen and ethylene;

e) returning at least a portion of said carbon dioxide and said water vapor to the chamber, and f) venting said oxygen and ethylene to environment.

2. The method as claimed in claim 1 comprising sensing the composition of the atmosphere within the chamber and varying the amount of carbon dioxide and water vapor returned thereto to thereby produce and/or maintain a predetermined atmosphere composition within the chamber.

3. The method as claimed in claim 1 wherein the chamber is an ISO goods transport container.

4. An apparatus for modifying the composition of an atmosphere comprising nitrogen, oxygen, carbon dioxide, water vapor and ethylene contained in a chamber, the apparatus comprising:

a compressor for pressurizing a portion of said atmosphere;

a semi-permeable membrane apparatus connected to the compressor and having membranes for separating the nitrogen from the portion of the atmosphere pressurized, thereby to produce separated nitrogen and a nitrogen-depleted pressurized atmosphere;

said semi-permeable membrane apparatus having a nitrogen outlet to said chamber to return said separated nitrogen to the chamber;

means for separating the carbon dioxide and the water vapor from the nitrogen-depleted pressurized atmosphere;

said carbon dioxide and water vapor separation means having a carbon dioxide and water vapor outlet to said chamber for returning at least a portion of said carbon dioxide and said water vapor to the chamber and a vent for venting said oxygen and ethylene to environment.

5. The apparatus of claim 4, wherein said carbon dioxide and water vapor separation means comprises a semi-permeable membrane device.

6. The apparatus of claim 4, wherein said carbon dioxide and water vapor separation means comprises a pressure swing absorption apparatus.

7. Apparatus as claimed in claim 4 wherein said semi-permeable membrane apparatus and said carbon dioxide and water separation means are connected so as to be operable in a recycle mode.

8. The apparatus as claimed in claim 4 further comprising means for sensing the composition of the atmosphere within the chamber and control means adapted, in response to the sensed composition, to vary the amount of carbon dioxide and water vapor returned to the chamber so as to produce and/or maintain a predetermined atmosphere composition within the chamber.

* * * * *